UNITED STATES PATENT OFFICE.

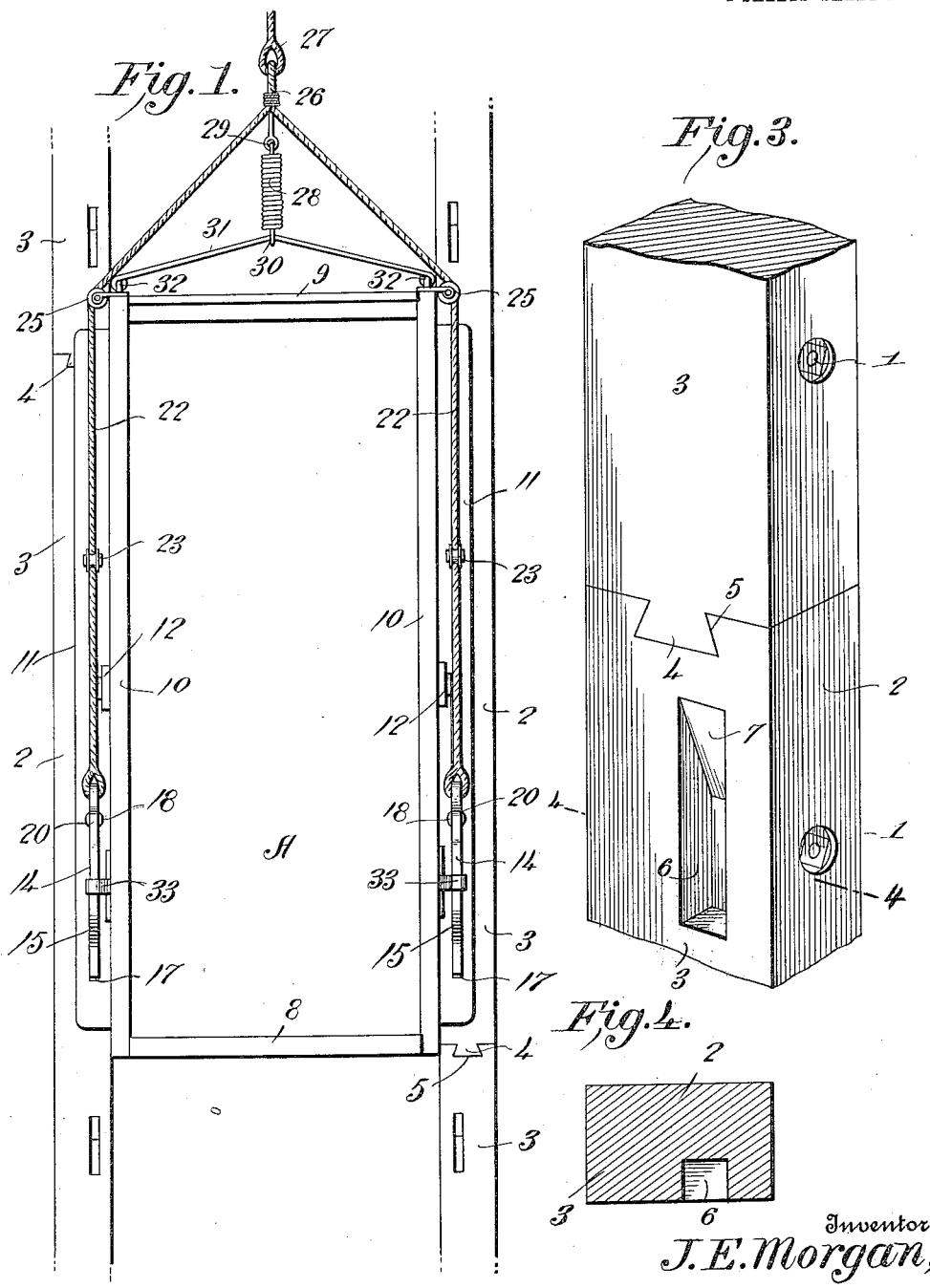

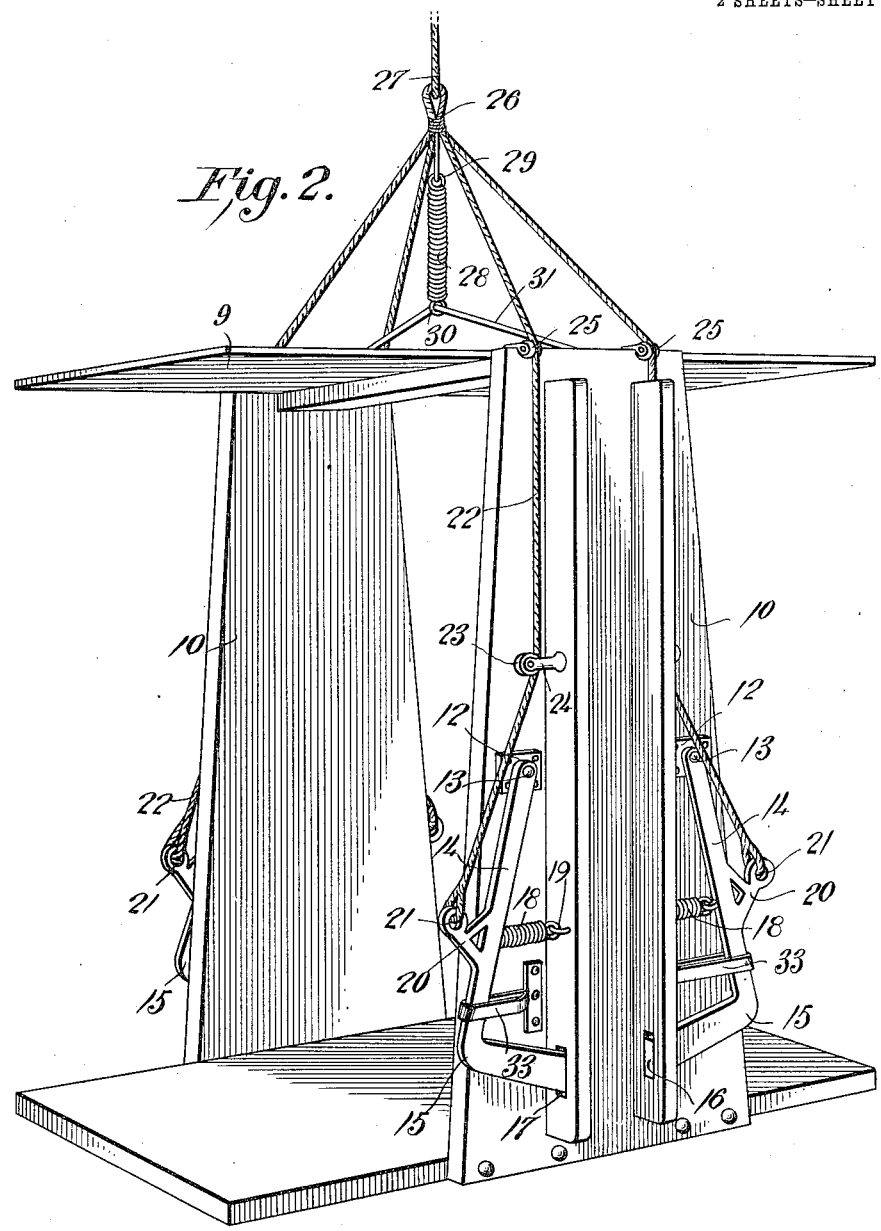

JOSEPH E. MORGAN, OF TAYLORVILLE, ILLINOIS.

AUTOMATIC BRAKE FOR ELEVATORS.

1,069,457. Specification of Letters Patent. Patented Aug. 5, 1913.

Application filed July 2, 1912. Serial No. 707,271.

*To all whom it may concern:*

Be it known that I, JOSEPH E. MORGAN, a citizen of the United States of America, residing at Taylorville, in the county of Christian and State of Illinois, have invented new and useful Improvements in Automatic Brakes for Elevators and the Like, of which the following is a specification.

This invention relates to improvements in brakes or stops and has particular application to automatic brakes for use on mine cages, elevators and the like.

In carrying out the present invention, it is my purpose to provide an automatic brake whereby the mine cage or elevator as the case may be, will be brought to a stop and held from dropping within the shaft, in the event of the hoisting cable or other mechanism of the hoist breaking or being fractured.

Furthermore, I aim to provide an automatic brake or stop which will embrace the desired features of simplicity, efficiency and durability coupled with cheapness of cost in manufacture and installation and which will act immediately upon the hoist cable of the cage or elevator breaking.

It is also my purpose to provide a brake of the class described which will include the trackways or guides of the cage or elevator, the same having depressions or recesses in the opposite side faces thereof to receive the brake shoes of the mechanism carried by the cage or car, such shoes being operated or actuated automatically to engage in the depressions when the hoisting cable or the appurtenances relating thereto become broken, fractured or otherwise mutilated to release the cage.

With the above and other objects in view, the invention consists in the construction, combination and arrangement of parts hereinafter set forth in and falling within the scope of the claim.

In the accompanying drawings, Figure 1 is a vertical sectional view through a mine shaft showing the cage and trackways or guides therefor embodying my invention. Fig. 2 is a perspective view of the cage equipped with the present invention, the brake shoes being withdrawn. Fig. 3 is a perspective view of a portion of one of the tracks or guides, and Fig. 4 is a transverse section on the line 4—4 of Fig. 3.

In the embodiment of my invention selected for illustrative purposes, I have shown my improved automatic brake or stop as applied to a mine cage, but it will be understood, of course, that the invention in its useful application is not limited to this particular purpose as the stop may be employed on or adapted to elevators and other cars actuated from a hoist drum or the like.

Referring now to the accompanying drawings in detail, the letter A indicates a mine shaft to the opposite side walls or curbing, as it is sometimes called, of which are fastened in any suitable manner as by the bolts 1, vertical trackways or guides 2, 2, the bolts being passed through the guides and into the adjacent portions of the walls of the mine shaft. Each trackway or guide is preferably formed of a plurality of separable sections 3, as shown in Fig. 3, the opposite ends of each section being formed with dovetailed tongues and grooves 4 and 5 respectively, the tongue on the end of one section being designed to engage the groove on the adjacent end of the following section. The opposite sides of each section of the trackways are formed with recesses or depressions 6 adapted to receive the brake shoes, as will hereinafter appear, and the portion of the side of each guide immediately above each depression 6 therein and contiguous such depression is inclined or beveled downwardly as at 7 to form an entrance to the respective depression so that the particular brake shoe on the cage immediately above such depression will be guided into the same in the event of the hoist cable breaking, whereby the descent of the cage will be broken and the same held at a standstill in the mine shaft. The depressions at one side of each trackway or guide aline with those on the opposite side and such depressions are arranged at appropriate distances apart say, for instance, three feet.

The cage, in the present instance, consists of a base or floor board 8, a hood or top 9 and oppositely disposed side walls 10, 10 connected at their top and bottom edges to the hood and base of the cage respectively and holding such base and hood spaced apart. Bolted or otherwise fastened to each side wall 10 of the cage and extending at right angles to the respective side wall are runners 11, 11 suitably spaced apart and arranged in parallelism and designed to engage the opposite sides of the respective track or guide in the mine. Rigidly secured to each side wall 10 of the cage at the outer sides of the runners thereon, are plates 12 carrying pintles or pivot pins 13 each designed to pivotally receive one extremity of a brake lever 14, the free end of each brake lever being bent at an angle as at 15 and terminating in a brake shoe 16 and projecting through a slot 17 formed in the respective runner preferably adjacent to the lower end thereof. These brake levers 14, 14 each has connected thereto one extremity of a tension device such as a coiled contractile spring 18, the free extremity of which is fastened to the adjacent portion of the respective runner, as at 19, and these tension devices act normally to draw the brake levers toward the runners and move such levers in relatively opposite directions or toward one another to dispose the brake shoes 16 in contact with the opposite sides of the respective guide or trackway. Rigidly secured to each brake lever 14 is a bracket 20 formed with an eye 21 receiving one extremity of a cable 22 the latter being trained over a guide sheave 23 carried by a bracket 24 secured to the respective runner or the respective portion of the side wall of the cage, as desired. After passing over the sheaves 23, each cable 22 is carried through a suitable guide 25 at the top edge of the respective side wall, and all of the cables 22 merge into a common loop 26 to which is connected one end 27 of the hoist cable, the free end of the latter being wound about the hoist drum (not shown) as usual. From this construction, it will be seen that as long as the hoisting cable is taut, the cables 22 will be tight and the brake levers and shoes carried thereby maintained inoperative against the action of the springs 18 so that the cage may traverse the guides of the shaft freely, the shoes being disengaged from the sides of such guides. On the contrary, should the hoist cable break with the effect to release the cage and permit the same to drop, the springs 18 will act to draw the brake levers inwardly toward the runners and so engage the brake shoes 16 with the sides of the guides. Now, supposing the brake shoes to be midway of a pair of depressions, the brake shoes will ride or rub against the trackways and enter the depressions 6 immediately below such shoes, the shoes being guided into the respective depressions by the inclined or beveled portions 7 immediately above such depressions.

In order to permit the brake shoes to engage the guides immediately upon the breaking of the hoisting cable and to assist the springs 18 by removing tension from the cables 22 by slackening such cables, I make use of a strong contractile spring 28 having one end connected as at 29 to the loop 26 of the cables 22 and its opposite end connected as at 30 to a rope or the like 31 spanning the hood 9 and connected at its opposite extremities to eyes 32, 32 secured to the upper edges of the side walls 10 of the cage. In the normal operation of the cage, the action of the spring 28 is overcome by the weight of the cage and the tension on the hoisting cable. If, however, the hoisting cable breaks the spring 28 is released and acts to slacken the ropes or cables 22, 22, thereby permitting the brake shoes to respond immediately and prevent any appreciable dropping of the cage in the shaft.

Rigidly secured to each side wall 10 of the cage at the outer sides of the runners 11, 11 thereon are metallic straps 33, 33 each embracing the respective brake lever and designed to hold such lever against excessive outward movement under the weight of the cage when operating normally.

From the foregoing description taken in connection with the accompanying drawings, the construction and mode of operation of my improved automatic brake or stop will be readily apparent, and while I have herein shown and described one particular embodiment of my invention by way of illustration, I desire to have it understood that I do not confine myself to the precise details herein described and delineated, as modification and variation may be made within the scope of the claim and without departing from the spirit of the invention. Furthermore, it is to be understood that the invention in its useful application is not limited to the particular purpose herein delineated, as the same may be advantageously employed or utilized on elevators, and other cars actuated by means of a hoist.

I claim:

In an automatic brake, the combination of a trackway, a car adapted to travel on the trackway and including side walls and runners secured to each side wall and spaced apart to embrace the opposite sides of the respective guide and provided with openings, with brake levers disposed at the opposite sides of said runners and each pivoted at one end to the respective side wall and bent at an angle, the bent portion projecting through the slot in the respective runner and terminating in a brake shoe, springs connecting said levers to said runners and acting to normally force the brake shoes into engagement with the guides, a hoist cable for the car, cables connecting the hoist cable to said brake levers and normally holding the brake shoes away from the guides when the hoist cable is taut, metallic straps secured to the side walls of the car and embracing said brake levers to limit the outward movement thereof under the action of the last-mentioned cables, and a spring for slackening said last cables when the hoist cable breaks whereby the first-mentioned springs may act to throw the brake shoes into engagement with said guides.

In testimony whereof I affix my signature in presence of two witnesses.

JOSEPH E. MORGAN.

Witnesses:
 H. M. MONNE,
 JAMES H. FORRESTER.

Copies of this patent may be obtained for five cents each, by addressing the "Commissioner of Patents, Washington, D. C."